(12) United States Patent
Ishikawa et al.

(10) Patent No.: US 12,331,153 B2
(45) Date of Patent: Jun. 17, 2025

(54) EPOXY RESIN COMPOSITION, MOLDING MATERIAL FOR FIBER-REINFORCED COMPOSITE MATERIAL, AND FIBER-REINFORCED COMPOSITE MATERIAL

(71) Applicant: TORAY INDUSTRIES, INC., Tokyo (JP)

(72) Inventors: Norikazu Ishikawa, Nagoya (JP); Tatsuya Takamoto, Nagoya (JP); Nobuyuki Tomioka, Nagoya (JP)

(73) Assignee: TORAY INDUSTRIES, INC., Tokyo (JP)

(*) Notice: Subject to any disclaimer, the term of this patent is extended or adjusted under 35 U.S.C. 154(b) by 212 days.

(21) Appl. No.: 17/773,110

(22) PCT Filed: Dec. 2, 2020

(86) PCT No.: PCT/JP2020/044789
§ 371 (c)(1),
(2) Date: Apr. 29, 2022

(87) PCT Pub. No.: WO2021/112111
PCT Pub. Date: Jun. 10, 2021

(65) Prior Publication Data
US 2024/0150517 A1    May 9, 2024

(30) Foreign Application Priority Data
Dec. 4, 2019   (JP) ................ 2019-219271

(51) Int. Cl.
*C08G 18/58* (2006.01)
*C08G 18/38* (2006.01)
*C08G 18/75* (2006.01)
*C08G 18/76* (2006.01)
*C08G 18/79* (2006.01)
*C08J 5/24* (2006.01)
*C08K 3/04* (2006.01)
*C08K 7/06* (2006.01)

(52) U.S. Cl.
CPC ......... *C08G 18/58* (2013.01); *C08G 18/3819* (2013.01); *C08G 18/388* (2013.01); *C08G 18/755* (2013.01); *C08G 18/758* (2013.01); *C08G 18/7621* (2013.01); *C08G 18/7664* (2013.01); *C08G 18/7671* (2013.01); *C08G 18/792* (2013.01); *C08G 18/797* (2013.01); *C08J 5/243* (2021.05); *C08K 3/04* (2013.01); *C08K 7/06* (2013.01)

(58) Field of Classification Search
CPC ........ C08G 18/58; C08G 18/38; C08G 18/75; C08G 18/76; C08G 18/79; C08G 18/724; C08J 5/24; C08K 3/04; C08K 7/06

USPC ......................................................... 523/468
See application file for complete search history.

(56) References Cited

U.S. PATENT DOCUMENTS

| | | | |
|---|---|---|---|
| 2020/0157292 A1* | 5/2020 | Hondo | C08G 59/688 |
| 2021/0301137 A1 | 9/2021 | Abe et al. | |

FOREIGN PATENT DOCUMENTS

| | | | |
|---|---|---|---|
| JP | 2005-247879 A | 9/2005 | |
| JP | 2007-138136 A | 6/2007 | |
| JP | 2015-229763 A | 12/2015 | |
| JP | 2016-56262 A | 4/2016 | |
| JP | 2019-14797 A | 1/2019 | |
| JP | 2019-85508 A | 6/2019 | |
| WO | WO-2018216643 A1 * | 11/2018 | C08G 59/40 |

OTHER PUBLICATIONS

Chinese Office Action for Chinese Application No. 202080082512.0, dated Oct. 26, 2023, with English translation.
Japanese Office Action for Japanese Application No. 2020-567631, dated Jul. 17, 2024, with English translation.
International Search Report, issued in PCT/JP2020/044789, PCT/ISA/210, dated Jan. 26, 2021.
Written Opinion of the International Searching Authority, issued in PCT/JP2020/044789, PCT/ISA/237, dated Jan. 26, 2021.

* cited by examiner

*Primary Examiner* — Deve V Hall
(74) *Attorney, Agent, or Firm* — Birch, Stewart, Kolasch & Birch, LLP

(57) ABSTRACT

The purposes of the present invention are: to provide an epoxy resin composition having excellent impregnation into reinforcing fibers, excellent shapability under low-temperature conditions after thickening, and excellent heat resistance after curing; to provide a molding material for a fiber-reinforced composite material, said molding material having excellent shapability during handling and excellent fluidity during press molding; and to provide a fiber-reinforced composite material having excellent heat resistance and bending strength. To achieve the abovementioned purposes, the present invention provides an epoxy resin composition containing all of the following components (A)-(D), wherein: the content of the component (A), in terms of 100 mass % of the total mass of the epoxy resin composition, is 30-95 mass %; and the ratio Wc/Wd of the content Wc of the component (C) to the content Wd of the component (D) is 0.01-10. Component (A) is an epoxy resin; component (B) is a curing agent; component (C) is a diisocyanate compound having consecutive double bonds, an alicyclic structure or a heterocyclic structure; and component (D) is a polyisocyanate compound excluding the component (C).

13 Claims, No Drawings

EPOXY RESIN COMPOSITION, MOLDING MATERIAL FOR FIBER-REINFORCED COMPOSITE MATERIAL, AND FIBER-REINFORCED COMPOSITE MATERIAL

TECHNICAL FIELD

The present invention relates to an epoxy resin composition preferably used in fiber-reinforced composite materials such as aerospace members and automobile members, as well as to a molding material for a fiber-reinforced composite material and a fiber-reinforced composite material, containing the epoxy resin composition.

BACKGROUND ART

Fiber-reinforced composite materials containing a reinforcing fiber and a matrix resin have been utilized in structural materials of aircraft and automobiles, sports applications such as tennis rackets, golf shafts, and fishing rods, industrial applications, and the like to make use of the high specific strength and specific elastic modulus thereof. As the reinforcing fiber, fibers such as glass fibers, aramid fibers, carbon fibers, and boron fibers are used. As the matrix resin, both thermosetting resins and thermoplastic resins are used. The thermosetting resins are more often used from the viewpoints of heat resistance and productivity. As the thermosetting resin, resins such as epoxy resins, unsaturated polyester resins, vinyl ester resins, phenol resins, bismaleimide resins, and cyanate resins are used. Among them, epoxy resins are preferably used from the viewpoints of adhesiveness between the resin and the reinforcing fiber, dimensional stability, and mechanical properties such as strength and stiffness of the resulting composite material.

In production of fiber-reinforced composite materials, a hand lay-up method, a filament winding method, a pultrusion method, a resin transfer molding (RTM) method, press forming methods of molding materials for fiber-reinforced composite materials, such as prepregs, tow prepregs, bulk molding compounds (BMCs), and sheet molding compounds (SMCs), and similar methods are used. These molding materials for fiber-reinforced composite materials are produced by impregnating a reinforcing fiber with a matrix resin. BMC and SMC are produced by further allowing the reinforcing fiber after impregnation to stand at normal temperature or heat-treating the reinforcing fiber after impregnation to thicken the resin composition. Examples of a technique known as such a thickening method include a technique of dissolving or swelling thermoplastic particles or a thermoplastic resin in an epoxy resin, a technique of reacting an epoxy group with an amine or an acid anhydride to form a crosslinked structure, and a technique of reacting an isocyanate with a hydroxyl group to form a polyurethane in a system.

To cope with such situation, there is disclosed an epoxy resin composition containing a hydroxy-containing vinylester as a hydroxyl group source and a urethane prepolymer that is prepared in advance by reaction of a low-molecular-weight diol with 4,4'-diphenylmethane diisocyanate (Patent Document 1). In addition, there is disclosed an epoxy resin composition containing a liquid bisphenol A epoxy as a hydroxyl group source and a polymeric MDI (Patent Document 2). Furthermore, there is disclosed an epoxy resin composition containing a urethane prepolymer that is prepared in advance by reaction of a polyether polyol with TDI (Patent Document 3).

PRIOR ART DOCUMENTS

Patent Documents

Patent Document 1: Japanese Patent Laid-open Publication No. 05-78445
Patent Document 2: Japanese Patent Application No. 2010-517848
Patent Document 3: Japanese Patent Laid-open Publication No. 2017-82128

SUMMARY OF THE INVENTION

Problems to be Solved by the Invention

With regard the epoxy resin for which these thickening methods are used, it is preferable that the resin viscosity at 30° C. be low from the viewpoint of the impregnating properties into a reinforcing fiber. On the other hand, it is preferable that the resin after thickening have a sufficient viscosity to prevent the resin from leaking from the fiber while standing still. The viscosity of the resin varies depending on the temperature in the season and increases particularly at 0 to 10° C. in winter. When the resin after thickening is bent during shaping, the resin may fracture. Thus, in order to maintain good shapability regardless of seasonal variations, it is necessary that the resin after thickening be sufficiently flexible even at low temperature.

Furthermore, a molding material for a fiber-reinforced composite material that is obtained using the epoxy resin composition is required to have good flowability during molding. In addition, the fiber-reinforced composite material obtained using the molding material for a fiber-reinforced composite material is required to have sufficient heat resistance and bending strength so that the shape is not deformed during demolding.

With regard to the epoxy resin composition described in Patent Document 1, the urethane prepolymer obtained from an aliphatic low-molecular-weight diol has a high viscosity at 30° C. and decreases the heat resistance of the fiber-reinforced composite material when blended. In order to suppress this decrease in heat resistance, it is necessary to blend a large amount of a high-viscosity hydroxy-containing vinylester. Consequently, the resulting epoxy resin composition has a high viscosity and insufficient impregnating properties into a reinforcing fiber. In addition, the thickened resin has a high viscosity at 10° C. and the shapability under low temperature conditions is insufficient. The resulting fiber-reinforced composite material also has low bending strength.

With regard to the epoxy resin composition described in Patent Document 2, since the polymeric MDI has 3 or more isocyanate groups in one molecule, the cured product of the epoxy resin composition is excellent in heat resistance. The thickened resin, however, has a high viscosity at 10° C. and has insufficient shapability under low temperature conditions. Thus, the resulting molding material for a fiber-reinforced composite material has insufficient shapability and also has insufficient flowability during molding.

With regard to the epoxy resin composition described in Patent Document 3, the urethane prepolymer that is prepared in advance by the reaction of polyether polyol with TDI has a flexible molecular skeleton composed of an aliphatic moiety, and the thickened resin of the resulting epoxy resin composition has a low viscosity at 10° C. The cured product, however, has insufficient heat resistance. Furthermore, since a high-molecular-weight urethane prepolymer is blended, the epoxy resin composition has a high resin viscosity and insufficient impregnating properties into a reinforcing fiber. In addition, the resulting fiber-reinforced composite material also has low bending strength.

As described above, in the related art, there is no technique that is capable of maintaining good impregnating properties into a reinforcing fiber, enables a molding material for a fiber-reinforced composite material to exhibit excellent shapability under low temperature conditions, and further enables the resulting fiber-reinforced composite material to exhibit heat resistance and bending strength.

It is therefore an object of the present invention to provide an epoxy resin composition that is excellent in impregnating properties into the reinforcing fiber, excellent in shapability under low temperature conditions after thickening, and excellent in heat resistance after curing, to provide a molding material for a fiber-reinforced composite material that is produced using the epoxy resin composition and is excellent in shapability during handling and flowability during press forming, and to provide a fiber-reinforced composite material that is formed using the molding material for a fiber-reinforced composite material and is excellent in heat resistance and bending strength, in order to improve the disadvantages of the related art.

Solutions to the Problems

In order to solve the above-mentioned problems, the epoxy resin composition of the present invention has the following constitution. More specifically, the epoxy resin composition is an epoxy resin composition containing all of the following components (A) to (D), wherein the content of the component (A) is 30% by mass or more and 95% by mass or less per 100% by mass of the total mass of the epoxy resin composition, and the ratio Wc/Wd of the content Wc of the component (C) to the content Wd of the component (D) is 0.01 or more and 10 or less.
component (A): an epoxy resin
component (B): a hardener
component (C): a diisocyanate compound having consecutive double bonds, an alicyclic structure, or heterocyclic structure
component (D): a polyisocyanate compound excluding the component (C)

Effects of the Invention

According to the present invention, it is possible to provide an epoxy resin composition that is excellent in impregnating properties into the reinforcing fiber, excellent in shapability under low temperature conditions after thickening, and excellent in heat resistance after curing, to provide a molding material for a fiber-reinforced composite material that is produced using the epoxy resin composition and is excellent in shapability during handling and flowability during press forming, and to provide a fiber-reinforced composite material that is formed using the molding material for a fiber-reinforced composite material and is excellent in heat resistance and mechanical properties.

EMBODIMENTS OF THE INVENTION

Hereinafter, preferred embodiments of the present invention will be described. First, the epoxy resin composition according to the present invention will be described.

The epoxy resin composition of the present invention contains all of the following components (A) to (D), wherein the content of the component (A) is 30% by mass or more and 95% by mass or less per 100% by mass of the total mass of the epoxy resin composition, and the ratio Wc/Wd of the content Wc of the component (C) to the content Wd of the component (D) is 0.01 or more and 10 or less.
component (A): an epoxy resin
component (B): a hardener
component (C): a diisocyanate compound having consecutive double bonds, an alicyclic structure, or heterocyclic structure
component (D): a polyisocyanate compound excluding the component (C)

The epoxy resin as the component (A) in the present invention is not particularly limited as long as it is a compound containing one or more epoxy groups in the molecule. Examples of the component (A) include bisphenol A epoxy resins, bisphenol F epoxy resins, biphenyl epoxy resins, dicyclopentadiene epoxy resins, and epoxy resins obtained by modifying the above-mentioned resins. Examples of the epoxy resin further include phenol novolac epoxy resins, cresol epoxy resins, glycidyl amine epoxy resins such as tetraglycidyl diaminodiphenylmethane, triglycidyl aminophenol, and tetraglycidylamine, glycidyl ether epoxy resins such as tetrakis(glycidyloxyphenyl)ethane and tris(glycidyloxymethane), epoxy resins obtained by modifying the above-mentioned resins, brominated epoxy resins obtained by brominating the above-mentioned epoxy resins, and polyglycidyl ethers of aliphatic alcohols, but are not limited thereto. Examples of the aliphatic alcohol include 1,4-butanediol, 3-methyl-1,5-pentanediol, diethylene glycol, neopentyl glycol, 1,6-hexanediol, 1,9-nonanediol, cyclohexanedimethanol, propylene glycol, glycerin, polyglycerin, trimethylolpropane, butyl alcohol, isobutyl alcohol, s-butyl alcohol, 2-ethylhexanol, stearyl alcohol, isostearyl alcohol, and lauryl alcohol. As the component (A), these epoxy resins may be used in combination of two or more.

In the epoxy resin composition of the present invention, it is preferable that the component (A) be a hydroxy-containing epoxy resin that is liquid at 30° C. Such an epoxy resin makes it easy to obtain a molding material for a fiber-reinforced composite material that has better shapability under low temperature conditions and exhibits excellent flow properties.

Examples of the commercial product of the bisphenol A epoxy resin include "jER (registered trademark)" 825, "jER (registered trademark)" 826, "jER (registered trademark)" 827, "jER (registered trademark)" 828, "jER (registered trademark)" 834, "jER (registered trademark)" 1001, "jER (registered trademark)" 1002, "jER (registered trademark)" 1003, "jER (registered trademark)" 1004, "jER (registered trademark)" 1004AF, "jER (registered trademark)" 1007, and "jER (registered trademark)" 1009 (all manufactured by Mitsubishi Chemical Corporation), "EPICLON (registered trademark)" 850 (manufactured by DIC Corporation), "Epotohto (registered trademark)" YD-128 (manufactured by Nippon Steel & Sumikin Chemical Co., Ltd.), "DER (registered trademark)"-331, and "DER (registered trademark)"-332 (manufactured by The Dow Chemical Company).

Examples of the commercial product of the bisphenol F epoxy resin include "jER (registered trademark)" 806, "jER (registered trademark)" 807, "jER (registered trademark)" 1750, "jER (registered trademark)" 4004P, "jER (registered trademark)" 4007P, and "jER (registered trademark)" 4009P (all manufactured by Mitsubishi Chemical Corporation), "EPICLON (registered trademark)" 830 (manufactured by DIC Corporation), "Epotohto (registered trademark)" YDF-170, "Epotohto (registered trademark)" YDF2001, and "Epotohto (registered trademark)" YDF2004 (all manufactured by Nippon Steel & Sumikin Chemical Co., Ltd.). Examples of the commercial product of a tetramethyl bisphenol F epoxy resin that is an alkyl-substituted derivative include "Epotohto (registered trademark)" YSLV-80XY (manufactured by Nippon Steel & Sumikin Chemical Co., Ltd.).

Examples of the bisphenol S epoxy resin include "EPICLON (registered trademark)" EXA-1515 (manufactured by DIC Corporation).

Examples of the commercial product of the phenol novolac epoxy resin include "jER (registered trademark)" 152 and "jER (registered trademark)" 154 (both manufactured by Mitsubishi Chemical Corporation), "EPICLON (registered trademark)" N-740, "EPICLON (registered trademark)" N-770, and "EPICLON (registered trademark)" N-775 (all manufactured by DIC Corporation).

Examples of the commercial product of the cresol novolac epoxy resin include "EPICLON (registered trademark)" N-660, "EPICLON (registered trademark)" N-665, "EPICLON (registered trademark)" N-670, "EPICLON (registered trademark)" N-673, and "EPICLON (registered trademark)" N-695 (all manufactured by DIC Corporation), EOCN-1020, EOCN-1025, and EOCN-1045 (all manufactured by Nippon Kayaku Co., Ltd.).

Examples of the commercial product of the polyglycidyl ether of the aliphatic alcohol include "DENACOL (registered trademark)" EX-321, "DENACOL (registered trademark)" EX-313, "DENACOL (registered trademark)" EX-314, "DENACOL (registered trademark)" EX-411, "DENACOL (registered trademark)" EX-412, "DENACOL (registered trademark)" EX-512, "DENACOL (registered trademark)" EX-521, "DENACOL (registered trademark)" EX-612, DENACOL (registered trademark)" EX-614, and "DENACOL (registered trademark)" EX-614 B (all manufactured by Nagase ChemteX Corporation), "EPIOL (registered trademark)" G-100 (manufactured by NOF Corporation), SR-GLG, SR-DGE, SR-TMP, SR-SEP, and SR-4 GL (all manufactured by Sakamoto Yakuhin Kogyo Co., Ltd.).

In the epoxy resin composition of the present invention, the content of the component (A) is 30% by mass or more and 95% by mass or less per 100% by mass of the total mass of the epoxy resin composition. When the content of the component (A) is 30% by mass or more, sufficient heat resistance can be exhibited. When the content of the component (A) is 95% by mass or less, a sufficient effect of improving the bending strength can be obtained. The content of the component (A) is more preferably 50% by mass or more and 90% by mass or less.

The hardener as the component (B) in the present invention is not particularly limited as long as it can cure the epoxy resin, and examples thereof include amine-based, phenol-based, acid anhydride-based, and mercaptan-based hardeners, imidazole type hardeners, tertiary amines, organic phosphorus compounds, urea compounds, ammonium salts, and sulfonium salts. Examples of the amine-based hardener include dicyandiamide, aromatic polyamines, aliphatic amines, amino benzoic acid ester type hardeners, thiourea added amines, and hydrazides. Examples of the phenol-based hardener include bisphenols, phenol novolac resins, cresol novolac resins, and polyphenol compounds. Examples of the acid anhydride-based hardener include phthalic anhydride, maleic anhydride, succinic anhydride, and carboxylic acid anhydride. Examples of the mercaptan-based hardener include polymercaptan and polysulfide resins. Among the above-mentioned hardeners, amine-based hardeners are preferable.

In the epoxy resin composition of the present invention, it is particularly preferable that the component (B) be dicyandiamide or a derivative of dicyandiamide. Dicyandiamide easily imparts high bending strength and heat resistance to the cured resin. In addition, dicyandiamide is likely to be excellent to provide a preservation stability to the epoxy resin composition. The term "derivative of dicyandiamide" means a compound obtained by bonding dicyandiamide with some kind of compound. Similarly to dicyandiamide, the derivative of dicyandiamide is excellent in that it easily imparts high bending strength and heat resistance to the cured resin, and is also excellent to provide a preservation stability to the epoxy resin composition. Examples of the derivative of dicyandiamide include those obtained by bonding dicyandiamide with some kind of compound such as an epoxy resin, a vinyl compound, an acrylic compound, or 9,10-dihydro-9-oxa-10-phosphaphenanthrene-10-oxide. These derivatives may be used alone or in combination of two or more. The derivatives may also be used in combination with dicyandiamide. Examples of the commercial product of such dicyandiamide include "jERcure (registered trademark)" DICY7 and DICY15 (both manufactured by Mitsubishi Chemical Corporation).

The content of the component (B) in the present invention is preferably 1 part by mass or more and 50 parts by mass or less based on 100 parts by mass of the component (A). The content of the component (B) is more preferably 8 parts by mass or more and 50 parts by mass or less. When the content of the component (B) is 1 part by mass or more, a sufficient effect of improving the curability is likely to be obtained. When the content of the component (B) is 50 parts by mass or less, the heat resistance of a cured product of the resulting epoxy resin composition is more easily improved.

The component (C) in the present invention is not particularly limited as long as it is a diisocyanate compound having a consecutive double bond structure, alicyclic structure, or heterocyclic structure. Herein, examples of the consecutive double bond structure include allene structures, carbodiimide structures, and azide structures. The alicyclic structure is a cyclic chemical structure composed of an aliphatic chain, and examples thereof include cycloalkane structures and cycloalkene structures. The heterocyclic structure is a cyclic chemical structure containing at least two different elements in the ring, and examples thereof include uretdione rings, isocyanurate rings, and uretonimine rings. When the component (C) has the consecutive double bond structure, alicyclic structure, or heterocyclic structure, the component (C) has a functional group having high reactivity with active hydrogen or an epoxy group or has a structure having high rigidity. Hence, a cured product of the resulting epoxy resin composition exhibits high heat resistance.

With regard to the diisocyanate compound as the component (C), examples of the diisocyanate compound having a consecutive double bond structure include compounds that are carbodiimide-modified diisocyanate compounds. The diisocyanate compounds include aromatic diisocyanates, aliphatic diisocyanates, alicyclic diisocyanates, aralkyl diisocyanates, and mixtures thereof, such as 4,4'-diphenylmethane diisocyanate (MDI), 2,6-tolylene diisocyanate (2,6-TDI), 2,4-tolylene diisocyanate (2,4-TDI), naphthalene diisocyanate (NDI), 1-methoxybenzene-2,4-diisocyanate (MBDI), metaxylene diisocyanate (MXDI), 1,6-hexamethylene diisocyanate (HDI), 2,2,4-trimethylhexamethylene diisocyanate (TMHDI), 1,12-diisocyanate dodecane (DDI), hydrogenated xylylene diisocyanate (HXDI), norbornane diisocyanate (NBDI), isophorone diisocyanate (IPDI), 2,4'-bis(8-isocyanatooctyl)-1,3-dioctylcyclobutane (OCDI), 4,4'-dicyclohexylmethane diisocyanate (HMDI), xylylene diisocyanate (XDI), tetramethylxylylene diisocyanate (TMXDI), diphenyl sulfide-4,4'-diisocyanate, diphenyl sulfone-4,4'-diisocyanate, diphenyl ether-4,4'-diisocyanate, and diphenyl ketone-4,4'-diisocyanate.

Examples of the diisocyanate compound having an alicyclic structure include hydrogenated xylylene diisocyanate (HXDI), norbornane diisocyanate (NBDI), isophorone diisocyanate (IPDI), 2,4-bis(8-isocyanatooctyl)-1,3-dioctylcyclobutane (OCDI), and 4,4'-dicyclohexylmethane diisocyanate (HMDI).

Examples of the diisocyanate compound having a heterocyclic structure include dimers and trimers of diisocyanate compounds. The diisocyanate compounds include aromatic diisocyanates, aliphatic diisocyanates, alicyclic diisocyanates, aralkyl diisocyanates, and mixtures thereof, such as 4,4'-diphenylmethane diisocyanate (MDI), 2,6-tolylene diisocyanate (2,6-TDI), 2,4-tolylene diisocyanate (2,4-TDI), naphthalene diisocyanate (NDI), 1-methoxybenzene-2,4-diisocyanate (MBDI), metaxylene diisocyanate (MXDI), 1,6-hexamethylene diisocyanate (HDI), 2,2,4-trimethylhexamethylene diisocyanate (TMHDI), 1,12-diisocyanate dodecane (DDI), hydrogenated xylylene diisocyanate (HXDI), norbornane diisocyanate (NBDI), isophorone diisocyanate (IPDI), 2,4-bis(8-isocyanatooctyl)-1,3-dioctylcyclobutane (OCDI), 4,4'-dicyclohexylmethane diisocyanate (HMDI), xylylene diisocyanate (XDI), tetramethylxylylene diisocyanate (TMXDI), diphenyl sulfide-4,4'-diisocyanate, diphenyl sulfone-4,4'-diisocyanate, diphenyl ether-4,4'-diisocyanate, and diphenyl ketone-4,4'-diisocyanate. As the component (C), these diisocyanate compounds may be used in combination of two or more.

The commercial products of the component (C) are exemplified below. Examples of the diisocyanate having a consecutive double bond structure include "Millionate (registered trademark)" MTL, "Cosmonate (registered trademark)" LL, "Cosmonate (registered trademark)" LK, "Cosmonate (registered trademark)" LT, and "Cosmonate (registered trademark)" LI (all manufactured by Mitsui Chemicals, Inc.), and "Lupranate (registered trademark)" MM-103 (manufactured by BASF INOAC Polyurethanes Ltd.). Examples of the diisocyanate compound having an alicyclic structure include "Desmodur (registered trademark)" I and "Desmodur (registered trademark)" W (both manufactured by Sumika Covestro Urethane Co., Ltd.)", "Takenate (registered trademark)" 600 and "NBID (registered trademark)" norbornane diisocyanate (both manufactured by Mitsui Chemicals, Inc.), and dicyclohexylmethane-4,4'-diisocyanate (mixture of isomers) (manufactured by Tokyo Chemical Industry Co., Ltd.). Examples of the diisocyanate compound having a heterocyclic structure include "Desmodur (registered trademark)" N3400 (manufactured by Sumika Covestro Urethane Co., Ltd.).

In the epoxy resin composition of the present invention, the component (C) preferably has the following chemical structure in the molecule.

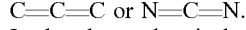

In the above chemical structure, = represents a double bond, — represents a covalent bond, C represents a carbon atom, and N represents a nitrogen atom. The component (C) having such a chemical structure is excellent in the rigidity of the skeleton, and the heat resistance of a cured product of the resulting epoxy resin composition is further improved.

In the epoxy resin composition of the present invention, it is more preferable that the component (C) have a linear structure. Herein, the linear structure is a structure in which carbon atoms are connected without being branched. The component (C) having a linear structure can have more excellent shapability under low temperature conditions.

In the epoxy resin composition of the present invention, it is also more preferable that the component (C) be an aromatic isocyanate compound. When the component (C) is an aromatic isocyanate compound, the cured product is likely to have more excellent heat resistance.

In the epoxy resin composition of the present invention, the viscosity at 30° C. of the component (C) is preferably 10 mPa·s or more and 1,000 mPa·s or less, more preferably 10 mPa·s or more and 600 mPa·s or less, and still more preferably 10 mPa·s or more and 300 mPa·s or less. Herein, the viscosity is measured by an E-type viscometer. When the viscosity at 30° C. is 10 mPa·s or more, the viscosity during resin impregnation will not excessively low, so that the resin will not flow out to the outside of the reinforcing fiber and is easily impregnated uniformly into the reinforcing-fiber base material. When the viscosity at 30° C. is 1,000 mPa·s or less, the impregnating properties into the reinforcing fiber is excellent, whereby a high quality fiber-reinforced composite material is obtained.

As the component (D), the epoxy resin composition of the present invention contains a polyisocyanate compound excluding the component (C).

Examples of the component (D) include 4,4'-diphenylmethane diisocyanate (MDI), 2,6-tolylene diisocyanate (2,6-TDI), 2,4-tolylene diisocyanate (2,4-TDI), naphthalene diisocyanate (NDI), 1-methoxybenzene-2,4-diisocyanate (MBDI), xylylene diisocyanate (XDI), meta-xylene diisocyanate (MXDI), 1,6-hexamethylene diisocyanate (HDI), 2,2,4-trimethylhexamethylene diisocyanate (TMHDI), 1,12-diisocyanate dodecane (DDI), tetramethylxylylene diisocyanate (TMXDI), diphenyl sulfide-4,4'-diisocyanate, diphenyl sulfone-4,4'-diisocyanate, diphenyl ether-4,4'-diisocyanate, diphenyl ketone-4,4'-diisocyanate, polymethylene polyphenyl polyisocyanate, and those having a structure in which the above-mentioned isocyanates are linked with a methylene group or the like. In addition, these polyisocyanate compounds and the like may be used alone or in combination of two or more.

In the epoxy resin composition of the present invention, the component (D) is more preferably a polyisocyanate compound having 3 or more and 10 or less isocyanate groups in one molecule. The number of isocyanate groups is preferably 3 or more in one molecule because the flowability of the molding material for a fiber-reinforced composite material which contains the resulting epoxy resin composition is improved. The number of isocyanate groups is preferably 10 or less in one molecule because a cured product of the resulting epoxy resin composition exhibits high heat resistance.

In the epoxy resin composition of the present invention, the component (D) is preferably an aromatic isocyanate compound. When the component (D) is an aromatic isocyanate compound, a cured product of the resulting epoxy resin composition is likely to exhibit higher heat resistance.

Examples of the commercial product of the component (D) include "Duranate (registered trademark)" D101 and "Duranate (registered trademark)" D201 (both manufactured by Asahi Kasei Corporation), "Lupranate (registered trademark)" MS, "Lupranate (registered trademark)" MI, "Lupranate (registered trademark)" M20S, "Lupranate (registered trademark)" M11S, "Lupranate (registered trademark)" M5S, "Lupranate (registered trademark)" T-80, "Lupranate (registered trademark)" MP-102, and "Lupranate (registered trademark)" MB-301 (all manufactured by BASF INOAC Polyurethanes Ltd.), HDI, "Millionate (registered trademark)" MR-100, "Millionate (registered trademark)" MR-200, "Millionate (registered trademark)" MR-400, "Coronate (registered trademark)" T-80, "Coronate (registered trademark)" T-65, and "Coronate (registered trademark)" T-100 (all manufactured by Tosoh Corporation), "Cosmonate (registered trademark)" PH, "Cosmonate (registered trademark)" T-80, and "Takenate (registered trademark)" 500 (all manufactured by Mitsui Chemicals, Inc.), and "Sumidur (registered trademark)" N 3300 (manufactured by Sumika Covestro Urethane Co., Ltd.).

In the epoxy resin composition of the present invention, the ratio Wc/Wd of the content Wc of the component (C) to the content Wd of the component (D) is 0.01 or more and 10 or less. When Wc/Wd is 0.01 or more, a molding material for a fiber-reinforced composite material which contains the resulting epoxy resin composition exhibits higher flowability. When Wc/Wd is 10 or less, a cured product of the resulting epoxy resin composition is likely to exhibit higher heat resistance. Wc/Wd is preferably 0.1 or more and 10 or less.

In the epoxy resin composition of the present invention, both the component (C) and the component (D) are more preferably aromatic isocyanate compounds. When both the component (C) and the component (D) are aromatic isocyanate compounds, the cured product is likely to have higher heat resistance.

The total amount of the isocyanate groups in the component (C) and the component (D) in the present invention is preferably 0.8 equivalent or more and 1.8 equivalents or less based on the amount of the hydroxyl groups in the component (A). The amount is more preferably 1.0 equivalent or more and 1.7 equivalents or less. The total amount of the isocyanate groups in the component (C) and the component (D) is preferably 0.8 equivalents or more based on the amount of the hydroxyl groups in the component (A) because the viscosity of the thickened resin is easily improved. The amount is preferably 1.8 equivalents or less because a cured product of the resulting epoxy resin composition exhibits higher heat resistance.

The epoxy resin composition of the present invention preferably further contains the following component (E).

The component (E): at least one compound selected from the group consisting of a quaternary ammonium salt, a phosphonium salt, an imidazole compound, and a phosphine compound.

Examples of the component (E) include quaternary ammonium salts such as tetramethylammonium chloride, tetramethylammonium bromide, tetramethylammonium iodide, and tetrabutylammonium bromide; phosphonium salts such as allyltriphenylphosphonium bromide, diallyldiphenylphosphonium bromide, ethyltriphenylphosphonium chloride, ethyltriphenylphosphonium iodide, tetrabutylphosphonium acetate, tetrabutylphosphonium chloride, tetrabutylphosphonium bromide, and tetrabutylphosphonium iodide; imidazole compounds such as 2-phenylimidazole and 2-methylimidazole; and phosphine compounds such as triphenylphosphine. These components (E) may be used alone or in combination of two or more. Among these, the quaternary ammonium salt and/or the phosphine compound is preferable as the component (E) because a curing time can be significantly shortened.

The component (E) in the present invention is preferably contained in an amount of 1 part by mass or more and 15 parts by mass or less based on 100 parts by mass of the component (A). The amount of the component (E) is preferably 1 part by mass or more based on 100 parts by mass of the component (A) because an effect of sufficiently improving curability can be obtained. The amount of the component (E) is preferably 15 parts by mass or less because an effect of sufficiently improving curability can be obtained without causing a decrease in heat resistance.

The epoxy resin composition of the present invention preferably has a viscosity at 30° C. of 0.01 Pa·s or more and 5 Pa·s or less, and more preferably 0.01 Pa·s or more and 2 Pa s or less as measured by an E-type viscometer immediately after preparation. A resin having a viscosity at 30° C. of 5 Pa·s or less is likely to have excellent impregnating properties into a reinforcing fiber. A resin having a viscosity at 30° C. of 0.01 Pa·s or more will not have too low a viscosity during impregnation, will hardly flow out to the outside, and is easily impregnated uniformly into the reinforcing fiber. The term "immediately after preparation" refers to a time point at which mixing and 1-minute stirring of the components have been finished. The term "viscosity immediately after preparation" refers to a value obtained by mixing the components and stirring the mixture for 1 minute to form an epoxy resin composition and measuring the viscosity of the epoxy resin composition.

The epoxy resin composition of the present invention preferably has a reaction onset temperature of 5° C. or higher and 80° C. or lower, more preferably 10° C. or higher and 60° C. or lower, or 20° C. or higher and 50° C. or lower. When the reaction onset temperature is 5° C. or higher, rapid thickening immediately after preparation is easily suppressed. When the reaction onset temperature is 80° C. or lower, a secondary reaction caused by a high temperature is easily suppressed, and more excellent shapability is exhibited. Herein, the reaction onset temperature is measured by the method described below using a differential calorimeter immediately after preparation.

In the epoxy resin composition of the present invention, the viscosity at 30° C. of the thickened resin obtained by holding the epoxy resin composition at 40° C. for 24 hours is preferably 100 Pa·s or more and 30,000 Pa·s or less, more preferably 100 Pa·s or more and 10,000 Pa·s or less, and still more preferably 100 Pa·s or more and 5,000 Pa·s or less. When the viscosity at 30° C. of the thickened resin is 100 Pa·s or more, resin sagging in a molding material containing the epoxy resin composition is easily suppressed. When the viscosity is 30,000 Pa·s or less, the molding material containing the epoxy resin composition is easily shaped without fracturing even at low temperature.

In the epoxy resin composition according to the present invention, the viscosity at 130° C. of the thickened resin is preferably 1 Pa·s or more and 100 Pa·s or less, and more preferably 5 Pa·s or more and 100 Pa·s or less. When the viscosity at 130° C. of the thickened resin is 1 Pa·s or more, a resin-rich part will hardly form during press forming a molding material containing the epoxy resin composition. When the viscosity is 100 Pa·s or less, during press forming a molding material containing an epoxy resin composition, the base material can be molded to the end without underfill, even into a complicated shape.

The heat resistance of the fiber-reinforced composite material obtained using the epoxy resin composition of the present invention depends on the glass transition temperature of the cured resin obtained by curing the epoxy resin composition. In order to obtain a fiber-reinforced composite material having high heat resistance, for example, the glass transition temperature of a cured resin obtained by heating the epoxy resin composition at a temperature of 140° C. for 2 hours to fully cure is preferably in the range of 120° C. or higher and 250° C. or lower, and more preferably 130° C. or higher and 220° C. or lower. When the glass transition temperature is 120° C. or higher, high heat resistance is imparted to the cured resin obtained by curing the epoxy resin composition. When the glass transition temperature is 250° C. or lower, a three-dimensional crosslinked structure of the cured resin obtained by curing the epoxy resin composition will not have too high a cross-linking density, and high mechanical properties are exhibited. Herein, the glass transition temperature of the cured epoxy resin obtained by curing the epoxy resin composition is determined by measurement using a dynamic mechanical analyzer (DMA). Specifically, DMA measurement is performed while ramping temperature using a rectangular test piece cut out from a cured resin plate, and the temperature at the inflection point of the obtained storage modulus G' is defined as Tg. The measurement conditions are as described in Examples.

The mechanical properties of the fiber-reinforced composite material containing the epoxy resin composition according to the present invention depend on the mechanical properties of the cured resin obtained by curing the epoxy resin composition. In order to obtain a fiber-reinforced composite material having high mechanical properties, for example, the bending strength of a cured resin obtained by heating the epoxy resin composition at a temperature of 140° C. for 2 hours to fully cure is preferably 110 MPa or more, and more preferably 120 MPa or more. When the bending strength of the cured resin is 110 MPa or more, the fiber-reinforced composite material containing the epoxy resin composition in the present invention is usable as an excellent member that will not fracture or deform even if the fiber-reinforced composite material is placed in an environment where it receives strong external stress.

The molding material for a fiber-reinforced composite material of the present invention contains the epoxy resin composition of the present invention and a reinforcing fiber. The molding material for a fiber-reinforced composite material of the present invention preferably contains the epoxy resin of the present invention and a reinforcing fiber.

In the molding material for a fiber-reinforced composite material of the present invention, the type and length of the reinforcing fiber, the content ratio between the reinforcing fiber and the resin, and the like are not particularly limited.

When a continuous reinforcing fiber is used, examples of the form of the reinforcing fiber include fiber structures such as long fibers in which filaments are arranged in one direction, single tows, woven fabrics, knits, and braids. Fiber structures having an average fiber diameter of the reinforcing fiber in the range of 3 μm or more and 12 μm or less and has a mass fraction of the reinforcing fiber in the range of 40% or less and 90% or less are preferably used. When the mass fraction of the reinforcing fiber is 40% or more, the resulting fiber-reinforced composite material will not have too large a mass, and the advantages of the fiber-reinforced composite material such as excellent specific strength and excellent specific elastic modulus are likely to be fully exhibited. When the mass fraction of the reinforcing fiber is 90% or less, the epoxy resin composition is likely to be excellent in impregnating properties into the reinforcing fiber. Examples of the fiber-reinforced composite material obtained using such continuous fiber include prepregs and tow prepregs.

When a discontinuous reinforcing fiber is used, examples of the form of the reinforcing fiber include fiber structures such as nonwoven fabrics and mats. Fiber structures having a fiber length of the reinforcing fiber in the range of 5 mm or more and 100 mm or less, an average fiber diameter of the reinforcing fiber in the range of 3 μm or more and 12 μm or less, and a mass fraction of the reinforcing fiber in the range of 40% or more and 90% or less are preferably used. When the mass fraction of the reinforcing fiber is 40% or more, the resulting fiber-reinforced composite material will not have too large a mass, and the advantages of the fiber-reinforced composite material such as excellent specific strength and excellent specific elastic modulus are likely to be fully exhibited. When the mass fraction of the reinforcing fiber is 90% or less, the epoxy resin composition is likely to be excellent in impregnating properties into the reinforcing fiber. Examples of the molding material for a fiber-reinforced composite material that is obtained using such discontinuous fiber include BMCs and SMCs. Among them, SMCs are particularly preferably used from the viewpoints of productivity and a flexibility in the shape of the molding.

The form of a bundle assembly of such discontinuous fiber is not particularly limited, and various techniques can be applied. As for the bundle assembly, it is preferable that in a plane of the bundle assembly in which the width of the bundle assembly in the direction perpendicular to the arrangement direction of the reinforcing fiber filaments is the largest, angles a and b, which are the degrees of acute angles of the sides formed by arrayed both ends of the reinforcing fiber filaments in the bundle assembly to the arrangement direction of the reinforcing fiber filaments, be each 2° or more and 30° or less. The smaller the angles a and b, which are the degrees of angles of the sides formed by arrayed both ends of the reinforcing fiber filaments in the bundle assembly to the arrangement direction of the reinforcing fiber filaments are, the higher the homogeneity of the bundle assembly and the resin in the SMC is. Therefore, a great effect of improving the surface quality and strength is exerted on a fiber-reinforced composite material formed using the SMC. The effect is remarkable when the angles a and b are each 30° or less. Meanwhile, the smaller the angles a and b are, the lower the handleability of the bundle assembly itself is. Further, the smaller the angle between the arrangement direction of the reinforcing fiber filaments and the cutting blade is, the lower the stability in the cutting step is. Therefore, the angles a and b are preferably each 2° or more. It is more preferable that the angles a and b be each 3° or more and 25° or less. It is still more preferable that the angles a and b be each 5° or more and 15° or less in view of the balance between the effect of improving the surface quality and strength of the fiber-reinforced composite material and the processability in the production process of the bundle assembly.

Examples of a cutter for cutting the continuous reinforcing fiber bundle for producing a bundle assembly of discontinuous reinforcing fiber filaments include guillotine cutters and rotary cutters such as roving cutters. The continuous reinforcing fiber bundle is inserted into the cutter and cut in a state where the longitudinal direction of the continuous reinforcing fiber bundle and the direction of the cutting blade equipped in the cutter are relatively oblique.

The method for producing the molding material for a fiber-reinforced composite material of the present invention is not particularly limited. For example, the molding material for a fiber-reinforced composite material of the present invention may be obtained by the following method. Specifically, the epoxy resin composition of the present invention is impregnated into a reinforcing fiber by a method suitable for the form of the reinforcing fiber, and then the resulting product is held at a temperature of about room temperature to about 80° C. for several hours to several days to bring the resin composition into a semi-cured state where the increase in viscosity of the resin composition is saturated. Herein, bringing the resin composition into a semi-cured state where the increase in viscosity of the resin composition is saturated is referred to as a thickened resin. In the evaluation of the present invention, the thickening conditions employed are holding the epoxy resin composition at 40° C. for 24 hours to saturate the increase in viscosity of the resin composition and bring the resin composition into a semi-cured state.

The reinforcing fiber is not particularly limited, and examples thereof include glass fibers, carbon fibers, graphite fibers, aramid fibers, boron fibers, alumina fibers and silicon carbide fibers. These reinforcing fibers may be used in combination of two or more. The reinforcing fiber is preferably a carbon fiber or graphite fiber from the standpoint that a more lightweight and more durable molded article is easily obtained. In particular, also in applications where there is a high demand for weight reduction and strength enhancement of the material, it is preferable that the reinforcing fiber be a carbon fiber from the standpoint that excellent specific elastic modulus and specific strength are easily achieved.

As the carbon fiber, any kind of carbon fiber can be used depending on the application. However, from the viewpoint of impact resistance, a carbon fiber having a tensile modulus of at most 400 GPa is preferable. From the viewpoint of strength, a carbon fiber having a tensile strength of 4.4 GPa or more and 6.5 GPa or less is preferable because a composite material having high stiffness and high mechanical strength can be easily obtained. Also, a carbon fiber having a tensile elongation of 1.7% or more and 2.3% or less is preferable. Accordingly, the carbon fiber is most preferably a fiber having all of a tensile modulus of at least 230 GPa, a tensile strength of at least 4.4 GPa, and a tensile elongation of at least 1.7%.

Examples of the commercial product of the carbon fiber include "Torayca (registered trademark)" T800G-24K, "Torayca (registered trademark)" T800S-24K, "Torayca (registered trademark)" T700G-24K, "Torayca (registered trademark)" T300-3K, and "Torayca (registered trademark)" T700S-12K (all manufactured by Toray Industries, Inc.).

The method for producing a fiber-reinforced composite material containing the epoxy resin composition according to the present invention is not particularly limited, but a hand lay-up method, a filament winding method, a pultrusion method, a resin transfer molding (RTM) method, an autoclave molding method of a prepreg, and further, press forming methods of molding materials for fiber-reinforced composite materials, such as prepregs, tow prepregs, bulk molding compounds (BMCs), and sheet molding compounds (SMCs) are preferably used.

The fiber-reinforced composite material of the present invention is a cured product of the molding material for a fiber-reinforced composite material of the present invention. With regard to the fiber-reinforced composite material, particularly in the case of a fiber-reinforced composite material used in the field of aircraft and automobiles, high heat resistance and mechanical properties such as bending strength are required. The fiber-reinforced composite material of the present invention is excellent in heat resistance and mechanical properties because the glass transition temperature of the cured epoxy resin as a matrix resin can be usually 120° C. or higher and 250° C. or lower, and the bending strength of the cured epoxy resin can be 110 MPa or more. Further, the molding material for a fiber-reinforced composite material of the present invention provides a fiber-reinforced composite material in which the fiber and the resin have very high homogeneity, because the resin does not singly flow first during press forming, and the molding material exhibits excellent flowability regardless of the molding temperature.

The method for producing a fiber-reinforced composite material of the present invention is not particularly limited, but a hand lay-up method, a filament winding method, a pultrusion method, a resin transfer molding (RTM) method, an autoclave molding method of a prepreg, and further, press forming methods of molding materials for fiber-reinforced composite materials, such as prepregs, tow prepregs, bulk molding compounds (BMCs), and sheet molding compounds (SMCs) are preferably used.

EXAMPLES

Hereinafter, the epoxy resin composition, the molding material for a fiber-reinforced composite material, and the fiber-reinforced composite material of the present invention will be described in more detail with reference to examples.
<Resin Raw Materials>
The following resin raw materials were used to prepare the epoxy resin compositions of the examples and comparative examples. The numerical value of each component in the column of "Epoxy resin composition" in the tables indicates the content, and the unit ("parts") is "parts by mass" unless otherwise specified.
1. Component (A): An Epoxy Resin
   "Epotohto (registered trademark)" YD128 (manufactured by NIPPON STEEL & SUMIKIN CHEMICAL CO., LTD.): Liquid bisphenol A epoxy resin (hydroxyl group equivalent: 1,250 g/mol)
   "jER (registered trademark)" 154 (manufactured by Mitsubishi Chemical Corporation): Phenol novolac epoxy resin (no hydroxyl group)
   "jER (registered trademark)" 1001 (manufactured by Mitsubishi Chemical Corporation): Solid bisphenol A epoxy resin (hydroxyl group equivalent: 313 g/mol)
   SR-DGE (manufactured by Sakamoto Yakuhin Kogyo Co., Ltd.): Diglycerol epoxy (hydroxyl group equivalent: 435 g/mol)
   "DENACOL (registered trademark)" EX-614 (manufactured by Nagase ChemteX Corporation): Sorbitol epoxy resin (hydroxyl group equivalent: 229 g/mol).
2. Component (B): A Hardener
   "jERcure (registered trademark)" DICY7 (manufactured by Mitsubishi Chemical Corporation): Dicyandiamide.
   3. Component (C): a diisocyanate compound having consecutive double bonds, an alicyclic structure, or heterocyclic structure
   "Desmodur (registered trademark)" N 3400 (manufactured by Sumika Covestro Urethane Co., Ltd.): HDI uretdione
   "Desmodur (registered trademark)" I (manufactured by Sumika Covestro Urethane Co., Ltd.): Isophorone diisocyanate
   "Desmodur (registered trademark)" W (manufactured by Sumika Covestro Urethane Co., Ltd.): Dicyclohexylmethane-4,4'-diisocyanate
   "Lupranate (registered trademark)" MM-103 (manufactured by BASF INOAC Polyurethanes Ltd.): Carbodiimide-modified MDI.

4. Component (D): A Polyisocyanate Compound Excluding the Component (C)

"Sumidur (registered trademark)" N 3300 (manufactured by Sumika Covestro Urethane Co., Ltd.): HDI isocyanate "Lupranate (registered trademark)" M20S (manufactured by BASF INOAC Polyurethanes Ltd.): Polymeric MDI (polymethylene polyphenyl polyisocyanate)

"Lupranate (registered trademark)" MI (manufactured by BASF INOAC Polyurethanes Ltd.): Monomeric MDI (diphenylmethane diisocyanate)

"Lupranate (registered trademark)" MP102 (manufactured by BASF INOAC Polyurethanes Ltd.): Urethane-modified MDI "Coronate (registered trademark)" T-100 (manufactured by Tosoh Corporation): TDI.

5. Component (E): At Least One Compound Selected from the Group Consisting of a Quaternary Ammonium Salt, a Phosphonium Salt, an Imidazole Compound, and a Phosphine Compound Tetrabutylammonium bromide (manufactured by Tokyo Chemical Industry Co., Ltd.)

Tetraphenylphosphonium bromide (manufactured by Tokyo Chemical Industry Co., Ltd.).

<Preparation of Epoxy Resin Compositions>

Epoxy resin compositions were prepared by mixing the components with the contents (parts by mass) shown in the tables.

<Measurement of Viscosity of Epoxy Resin Compositions Immediately after Preparation>

The specimen to be measured, while being held at 30° C., was subjected to the measurement according to JIS Z8803 (1991), "Viscosity measurement method using circular cone-flat plate type rotary viscometer" using an E-type viscometer equipped with a standard cone rotor (1°34'× R24). The E-type viscometer used was TVE-30H manufactured by TOKIMEC INC. The specimen used was an epoxy resin composition immediately after preparation.

<Measurement of Reaction Onset Temperature of Epoxy Resin Compositions Immediately after Preparation>

The specimen to be measured was used to measure the change in the calorific value of the epoxy resin composition when the temperature was changed at intervals of 10° C. in a temperature range of 20° C. to 130° C. and kept constant at each temperature stage. The measurement was performed using a differential calorimeter DSC 25 manufactured by TA. In the obtained exothermic curve, temperatures at which the maximum calorific value was kept for 5 minutes or shorter were determined. The lowest temperature among the temperatures was defined as the reaction onset temperature.

<Measurement of Shapability at 10° C. of Epoxy Resin Compositions after Thickening>

The specimen to be measured was shaped by hand according to a hat-shaped mold and then left for 5 minutes. At this time, the specimen that had its form maintained without being peeled off from the mold for more than 5 minutes was referred to as "A", the specimen that had its form maintained without being peeled off from the mold for 1 minute or more and 5 minutes or less was referred to as "B", and the specimen that had its form maintained without being peeled off from the mold for less than 1 minute, the specimen that fractured, or the specimen that failed to retain its shape was referred to as "C". Herein, as the hat shape, an aluminum mold having a total length of 300 mm, a total height of 40 mm, a top surface width of 40 mm, a flange width of 22 mm, and a radius of a curvature portion of 15 mm was used.

<Measurement of Viscosity of Epoxy Resin Compositions after Thickening>

Using a DMA (ARES manufactured by TA Instruments), the specimen to be measured was placed on a stage heated to 30° C., and the viscosity of the sample was measured while ramping the temperature at 10° C./min. The specimen used was an epoxy resin composition that was obtained by mixing the components and held at 40° C. for 24 hours. For example, the viscosity at 30° C. refers to the viscosity at the point when the specimen reached 30° C., and the viscosity at each temperature was measured in the same manner.

<Production of Cured Resins>

Each epoxy resin composition prepared in <Preparation of epoxy resin compositions> was defoamed in a vacuum, and then injected into a mold set to a thickness of 2 mm with a 2-mm thick "TEFLON (registered trademark)" spacer. The epoxy resin composition was cured at a temperature of 140° C. for 2 hours to give a cured resin having a thickness of 2 mm.

<Measurement of Glass Transition Temperature Tg of Cured Resins>

A test piece having a width of 12.7 mm and a length of 40 mm was cut out from the cured resin, and Tg was measured using DMA (ARES manufactured by TA Instruments). The measurement conditions included a temperature ramp rate of 5° C./min. The temperature at the inflection point of the storage modulus G' obtained in the measurement was defined as Tg.

<Measurement of Bending Strength of Cured Resins>

The bending strength of the cured resin obtained as described above was measured according to JIS K7074: 1988. A test piece was cut out so as to have a width of 15 mm and a length of 100 mm, and was subjected to a measurement by a 3-point bending test using an Instron universal testing machine (manufactured by Instron). Measurement was performed at a crosshead speed of 5 mm/min with a span of 80 mm using an indenter having a diameter of 5 mm and supporting points having a diameter of 2 mm to measure the bending strength. From measurement values of 5 samples, the converted values were calculated, and the average of the converted values was determined as the bending strength.

<Production of SMCs>

"Torayca (registered trademark)" T700S-12K (manufactured by Toray Industries, Inc.) was used as a carbon fiber. The continuous carbon fiber strands were cut at a desired angle, and the bundle assemblies of the carbon fibers were scattered so as to be uniformly dispersed to produce a discontinuous carbon fiber nonwoven fabric having an isotropic fiber orientation. A rotary cutter was used as a cutting device. A distance between blades was 30 mm. A basis weight of the discontinuous carbon fiber nonwoven fabric was 1 kg/m2. The discontinuous carbon fiber nonwoven fabric was sandwiched between polyethylene films coated with the epoxy resin composition so that the weight content of the carbon fiber of SMC to be obtained was 50%, and pressed with a roller to be impregnated with the epoxy resin composition, thereby obtaining a sheet-like SMC precursor. The SMC precursor was held at 40° C. for 24 hours to thicken the resin, thereby obtaining SMC.

<Measurement of Shapability at 10° C. of SMCs>

The specimen to be measured was shaped by hand according to a hat-shaped mold and then left for 5 minutes. At this time, the specimen that had its form maintained without being peeled off from the mold for more than 5 minutes was referred to as "A", the specimen that had its form maintained without being peeled off from the mold for 1 minute or more and 5 minutes or less was referred to as "B", and the specimen that had its form maintained without being peeled off from the mold for less than 1 minute, the specimen that fractured, or the specimen that failed to retain its shape was referred to as "C". Herein, as the hat shape, an aluminum mold having a total length of 300 mm, a total height of 40 mm, a top surface width of 40 mm, a flange width of 22 mm, and a radius of a curvature portion of 15 mm was used.

Examples 1 to 18

Resin compositions were prepared according to the preparation of resin compositions described above using the components of the types and contents (parts by mass) shown in Table 1, and the reaction onset temperature and the viscosity at 30° C. were measured. In addition, each epoxy resin composition was held at 40° C. for 24 hours to be thickened, and then the viscosities at 30° C. and 130° C. were measured, and the shapability was measured under the conditions of 10° C. Further, a cured resin of the epoxy resin composition and SMC were produced using the epoxy resin composition before thickening. The reaction onset temperature of the epoxy resin composition immediately after preparation was 80° C. or lower, and the viscosity at 30° C. was 5.0 Pa·s or less. The viscosity at 30° C. after thickening was 100 Pa·s or more, the viscosity at 130° C. after thickening was 1 Pa·s or more and 100 Pa·s or less, the shapability under the conditions of 10° C. was B or more, and the shapability under low temperature conditions was excellent. The cured resin obtained by curing the epoxy resin composition had a Tg of 120° C. or higher and a bending strength of 110 MPa or more. The shapability under the conditions of 10° C. of SMC containing the epoxy resin composition was B or more.

Comparative Example 1

A resin composition, a cured resin of an epoxy resin composition, and SMC were produced in the same manner as in Examples 1 to 18 except that the components of the types and contents (parts by mass) shown in Table 2 were used, and various measurements were performed. The epoxy resin composition immediately after preparation had a reaction onset temperature of 100° C., which was inadequate, and the viscosity at 30° C. was 5.0 Pa·s or less. The viscosity at 30° C. after thickening was 120 Pa·s, which was good, but the viscosity at 130° C. after thickening was 0.3 Pa·s, which was poor. The shapability under the conditions of 10° C. was C, which indicated that the shapability under low temperature conditions was poor. The cured resin obtained by curing the epoxy resin composition had a Tg of 115° C., which was poor, and had a bending strength of 108 MPa, which indicated that the mechanical properties were poor. The shapability under the conditions of 10° C. of SMC containing the epoxy resin composition was C.

Comparative Example 2

A resin composition, a cured resin of an epoxy resin composition, and SMC were produced in the same manner as in Examples 1 to 18 except that the components of the types and contents (parts by mass) shown in Table 2 were used, and various measurements were performed. The epoxy resin composition immediately after preparation had a reaction onset temperature of 90° C., which was inadequate, and the viscosity at 30° C. was 5.0 Pa·s or less. The viscosity at 30° C. after thickening was 1,590 Pa·s, which was good, but the viscosity at 130° C. after thickening was 0.7 Pa·s, which was poor. The shapability under the conditions of 10° C. was C, which indicated that the shapability under low temperature conditions was poor. The cured resin obtained by curing the epoxy resin composition had a Tg of 110° C., which was poor, and had a bending strength of 107 MPa, which indicated that the mechanical properties were poor. The shapability under the conditions of 10° C. of SMC containing the epoxy resin composition was C.

Comparative Example 3

A resin composition, a cured resin of an epoxy resin composition, and SMC were produced in the same manner as in Examples 1 to 18 except that the components of the types and contents (parts by mass) shown in Table 2 were used, and various measurements were performed. The epoxy resin composition immediately after preparation had a reaction onset temperature of 90° C., which was inadequate, and the viscosity at 30° C. was 5.0 Pa·s or less. However, the viscosity at 30° C. and the viscosity at 130° C. after thickening were 0.4 Pa·s and 0.02 Pa s, respectively, both which were poor. The shapability under the conditions of 10° C. was C, which indicated that the shapability under low temperature conditions was poor. The cured resin obtained by curing the epoxy resin composition had a Tg of 106° C., which was poor, and had a bending strength of 80 MPa, which indicated that the mechanical properties were poor. The shapability under the conditions of 10° C. of SMC containing the epoxy resin composition was C.

Comparative Example 4

A resin composition, a cured resin of an epoxy resin composition, and SMC were produced in the same manner as in Examples 1 to 18 except that the components of the types and contents (parts by mass) shown in Table 2 were used, and various measurements were performed. The epoxy resin composition immediately after preparation had a reaction onset temperature of 130° C., which was inadequate, and the viscosity at 30° C. was 5.0 Pa·s or more, which was inadequate. The viscosity at 30° C. and the viscosity at 130° C. after thickening were 2 Pa·s and 0.01 Pa·s, respectively, both which were poor. The shapability under the conditions of 10° C. was C, which indicated that the shapability under low temperature conditions was poor. The cured resin obtained by curing the epoxy resin composition had a Tg of 80° C., which was poor, and had a bending strength of 87 MPa, which indicated that the mechanical properties were poor. The shapability under the conditions of 10° C. of SMC containing the epoxy resin composition was C.

Comparative Example 5

A resin composition, a cured resin of an epoxy resin composition, and SMC were produced in the same manner as in Examples 1 to 18 except that the components of the types and contents (parts by mass) shown in Table 2 were used, and various measurements were performed. The epoxy resin composition immediately after preparation had a reaction onset temperature of 80° C., which was good, and the viscosity at 30° C. was 5.0 Pa s or less. The viscosity at 30° C. after thickening was 140 Pa·s, which was good, but the viscosity at 130° C. after thickening was 0.4 Pa·s, which was also poor. The shapability under the conditions of 10° C. was C, which indicated that the shapability under low temperature conditions was poor. The cured resin obtained by curing the epoxy resin composition had a Tg of 117° C., which was poor, and had a bending strength of 109 MPa, which indicated that the mechanical properties were poor. The shapability under the conditions of 10° C. of SMC containing the epoxy resin composition was C.

Comparative Example 6

A resin composition, a cured resin of an epoxy resin composition, and SMC were produced in the same manner as in Examples 1 to 18 except that the components of the types and contents (parts by mass) shown in Table 2 were used, and various measurements were performed. The epoxy resin composition immediately after preparation had a reaction onset temperature of 100° C., which was inadequate, and the viscosity at 30° C. was 5.0 Pa·s or less. The viscosity at 30° C. and the viscosity at 130° C. after thickening were 80 Pa·s and 0.1 Pa·s, respectively, both which were poor. The shapability under the conditions of 10° C. was C, which indicated that the shapability under low temperature conditions was poor. The cured resin obtained by curing the epoxy resin composition had a Tg of 108° C., which was poor, and had a bending strength of 100 MPa, which indicated that the mechanical properties were poor. The shapability under the conditions of 10° C. of SMC containing the epoxy resin composition was C.

TABLE 1

| | | | Example 1 | Example 2 | Example 3 | Example 4 | Example 5 | Example 6 |
|---|---|---|---|---|---|---|---|---|
| Epoxy resin composition | Component (A) | YD128 | 80 | 60 | 60 | 60 | 60 | 60 |
| | | 154 | — | 20 | 20 | 20 | 20 | 20 |
| | | 1001 | — | — | — | — | — | — |
| | | SR-DGE | 20 | — | — | — | — | — |
| | | EX-614 | — | 20 | 20 | 20 | 20 | 20 |
| | Component (B) | DICY7 | 10 | 10 | 10 | 10 | 10 | 10 |
| | Component (C) | Desmodur N 3400 | 10 | 10 | — | — | — | — |
| | | Desmodur I | — | — | 10 | — | — | — |
| | | Desmodur W | — | — | — | 10 | — | — |
| | | MM103 | — | — | — | — | 10 | 10 |
| | Component (D) | Sumidur N 3300 | 10 | 10 | 10 | 10 | 10 | — |
| | | M20S | — | — | — | — | — | 10 |
| | | MI | — | — | — | — | — | — |
| | | MP102 | — | — | — | — | — | — |
| | | T-100 | — | — | — | — | — | — |
| | Component (E) | Tetrabutylammonium bromide | — | — | — | — | — | — |
| | | Tetraphenylphosphonium bromide | — | — | — | — | — | — |
| Resin composition | Immediately after preparation | Reaction onset temperature (° C.) | 80 | 80 | 70 | 70 | 70 | 80 |
| | | Viscosity at 30° C. [Pa · s] | 4.8 | 4.2 | 2.1 | 2.3 | 2.6 | 2.0 |
| | After thickening | Shapability at 10° C. | B | B | A | A | A | A |
| | | Viscosity at 30° C. [Pa · s] | 9400 | 33000 | 28000 | 17000 | 13000 | 24000 |
| | | Viscosity at 130° C. [Pa · s] | 11 | 12 | 7 | 18 | 3 | 13 |
| | After curing | Glass transition temperature [° C.] | 124 | 130 | 123 | 127 | 130 | 135 |
| | | Bending strength [MPa] | 119 | 113 | 118 | 121 | 132 | 134 |
| SMC | After thickening | Shapability at 10° C. | B | B | B | B | B | B |

| | | | Example 7 | Example 8 | Example 9 | Example 10 | Example 11 | Example 12 |
|---|---|---|---|---|---|---|---|---|
| Epoxy resin composition | Component (A) | YD128 | 60 | 60 | 60 | 60 | 60 | 60 |
| | | 154 | 20 | 20 | 20 | 20 | 20 | — |
| | | 1001 | — | — | — | — | — | 20 |
| | | SR-DGE | — | — | — | — | — | — |
| | | EX-614 | 20 | 20 | 20 | 20 | 20 | 20 |
| | Component (B) | DICY7 | 10 | 10 | 10 | 10 | 10 | 10 |
| | Component (C) | Desmodur N 3400 | — | — | — | — | — | — |
| | | Desmodur I | — | — | — | — | — | — |
| | | Desmodur W | — | — | — | — | — | — |
| | | MM103 | 10 | 10 | 10 | 2 | 18 | 10 |
| | Component (D) | Sumidur N 3300 | — | — | — | — | — | 10 |
| | | M20S | — | — | — | 18 | 2 | — |
| | | MI | 10 | — | — | — | — | — |
| | | MP102 | — | 10 | — | — | — | — |
| | | T-100 | — | — | 10 | — | — | — |
| | Component (E) | Tetrabutylammonium bromide | — | — | — | — | — | — |
| | | Tetraphenylphosphonium bromide | — | — | — | — | — | — |

TABLE 1-continued

| | | | | | | | | |
|---|---|---|---|---|---|---|---|---|
| Resin composition | Immediately after preparation | Reaction onset temperature (° C.) | 70 | 70 | 70 | 80 | 60 | 70 |
| | | Viscosity at 30° C. [Pa · s] | 2.0 | 2.2 | 2.1 | 2.0 | 1.9 | 2.6 |
| | After thickening | Shapability at 10° C. | A | A | A | A | A | A |
| | | Viscosity at 30° C. [Pa · s] | 9200 | 11000 | 13000 | 32000 | 9800 | 43000 |
| | | Viscosity at 130° C. [Pa · s] | 1 | 8 | 4 | 23 | 11 | 86 |
| | After curing | Glass transition temperature [° C.] | 122 | 120 | 124 | 140 | 133 | 130 |
| | | Bending strength [MPa] | 120 | 123 | 117 | 138 | 132 | 132 |
| SMC | After thickening | Shapability at 10° C. | B | B | B | B | B | A |

| | | | Example 13 | Example 14 | Example 15 | Example 16 | Example 17 | Example 18 |
|---|---|---|---|---|---|---|---|---|
| Epoxy resin composition | Component (A) | YD128 | 70 | 70 | 70 | 70 | 70 | 70 |
| | | 154 | — | — | — | — | — | — |
| | | 1001 | — | — | — | — | — | — |
| | | SR-DGE | 20 | 20 | 20 | 20 | 20 | 20 |
| | | EX-614 | 10 | 10 | 10 | 10 | 10 | 10 |
| | Component (B) | DICY7 | 10 | 10 | 10 | 10 | 10 | 10 |
| | Component (C) | Desmodur N 3400 | — | — | — | — | — | — |
| | | Desmodur I | — | — | — | — | — | — |
| | | Desmodur W | — | — | — | — | — | — |
| | | MM103 | 10 | 20 | 5 | 25 | 20 | 20 |
| | Component (D) | Sumidur N 3300 | — | — | — | — | — | — |
| | | M20S | 10 | 5 | 20 | 3 | 5 | 5 |
| | | MI | — | — | — | — | — | — |
| | | MP102 | — | — | — | — | — | — |
| | | T-100 | — | — | — | — | — | — |
| | Component (E) | Tetrabutylammonium bromide | — | — | — | 3 | 10 | — |
| | | Tetraphenylphosphonium bromide | — | — | — | — | — | 5 |
| Resin composition | Immediately after preparation | Reaction onset temperature (° C.) | 60 | 50 | 50 | 40 | 30 | 40 |
| | | Viscosity at 30° C. [Pa · s] | 1.3 | 1.1 | 1.8 | 1.0 | 1.3 | 1.2 |
| | After thickening | Shapability at 10° C. | A | A | A | A | A | A |
| | | Viscosity at 30° C. [Pa · s] | 1500 | 600 | 900 | 820 | 1200 | 980 |
| | | Viscosity at 130° C. [Pa · s] | 36 | 5 | 14 | 12 | 2 | 3 |
| | After curing | Glass transition temperature [° C.] | 133 | 130 | 142 | 131 | 123 | 128 |
| | | Bending strength [MPa] | 134 | 136 | 144 | 139 | 131 | 137 |
| SMC | After thickening | Shapability at 10° C. | A | A | A | A | A | A |

TABLE 2

| | | | Comparative Example 1 | Comparative Example 2 | Comparative Example 3 | Comparative Example 4 | Comparative Example 5 | Comparative Example 6 |
|---|---|---|---|---|---|---|---|---|
| Epoxy resin composition | Component (A) | YD128 | 60 | 60 | 10 | 100 | 70 | 70 |
| | | 154 | 20 | 20 | — | — | — | — |
| | | 1001 | 20 | — | — | — | — | — |
| | | SR-DGE | — | — | — | — | 30 | 30 |
| | | EX-614 | — | 20 | — | — | — | — |
| | Component (B) | DICY7 | 10 | 10 | 10 | 2 | 10 | 10 |
| | Component (C) | Desmodur N 3400 | — | — | 80 | 3 | — | — |
| | | Desmodur I | — | — | — | — | — | — |
| | | Desmodur W | — | — | — | — | — | — |
| | | MM103 | — | — | — | — | 20 | — |
| | Component (D) | Sumidur N 3300 | — | — | — | — | — | — |
| | | M20S | — | — | — | — | — | — |
| | | MI | 20 | — | — | — | — | — |
| | | MP102 | — | 20 | — | — | — | — |
| | | T-100 | — | — | — | — | — | 20 |

TABLE 2-continued

| | | | Comparative Example 1 | Comparative Example 2 | Comparative Example 3 | Comparative Example 4 | Comparative Example 5 | Comparative Example 6 |
|---|---|---|---|---|---|---|---|---|
| Resin properties | Component (E) | Tetrabutylammonium bromide | — | — | — | — | — | — |
| | | Tetraphenylphosphonium bromide | — | — | — | — | — | — |
| | Immediately after preparation | Reaction onset temperature (° C.) | 100 | 90 | 90 | 130 | 80 | 100 |
| | | Viscosity at 30° C. [Pa·s] | 2.8 | 2.5 | 0.7 | 6.0 | 1.1 | 1.4 |
| | After thickening | Shapability at 10° C. | C | C | C | C | C | C |
| | | Viscosity at 30° C. [Pa·s] | 120 | 1590 | 0.4 | 2 | 140 | 80 |
| | | Viscosity at 130° C. [Pa·s] | 0.3 | 0.7 | 0.02 | 0.01 | 0.4 | 0.1 |
| | After curing | Glass transition temperature [° C.] | 115 | 110 | 106 | 80 | 117 | 108 |
| | | Bending strength [MPa] | 108 | 107 | 80 | 87 | 109 | 100 |
| SMC | After thickening | Shapability at 10° C. | C | C | C | C | C | C |

The invention claimed is:

1. An epoxy resin composition comprising all of the following components (A) to (D):
   component (A): an epoxy resin;
   component (B): a hardener;
   component (C): a diisocyanate compound having consecutive double bonds, an alicyclic structure, or heterocyclic structure; and
   component (D): a polyisocyanate compound having 3 or more and 10 or less isocyanate groups in one molecule, excluding the component (C),
   wherein a content of the component (A) is 30% by mass or more and 95% by mass or less per 100% by mass of a total mass of the epoxy resin composition, and a ratio Wc/Wd of a content Wc of the component (C) to a content Wd of the component (D) is 0.01 or more and 10 or less.

2. The epoxy resin composition according to claim 1, wherein a viscosity at 30° C. of the component (C) is 10 mPa·s or more and 1,000 mPa·s or less.

3. The epoxy resin composition according to claim 1, wherein the component (C) has, in a molecule, the following chemical structure:
   C=C=C or N=C=N.

4. The epoxy resin composition according to claim 1, wherein the component (C) has a linear structure.

5. The epoxy resin composition according to claim 1, wherein both the component (C) and the component (D) are aromatic isocyanate compounds.

6. The epoxy resin composition according to claim 1, further comprising the following component (E):
   component (E): at least one compound selected from the group consisting of a quaternary ammonium salt, a phosphonium salt, an imidazole compound, and a phosphine compound.

7. The epoxy resin composition according to claim 1, wherein a reaction onset temperature is 5° C. or higher and 80° C. or lower.

8. The epoxy resin composition according to claim 1, wherein a thickened resin obtained by holding the epoxy resin composition at 40° C. for 24 hours has a viscosity at 30° C. of 100 Pa·s or more and 30,000 Pa·s or less, and the thickened resin has a viscosity at 130° C. of 1 Pa·s or more and 100 Pa·s or less.

9. The epoxy resin composition according to claim 1, wherein the component (A) is a hydroxy-containing epoxy resin that is liquid at 30° C.

10. The epoxy resin composition according to claim 1, wherein the component (B) is dicyandiamide or a derivative of dicyandiamide.

11. A molding material for a fiber-reinforced composite material, the molding material comprising the epoxy resin composition according to claim 1 and a reinforcing fiber.

12. The molding material for a fiber-reinforced composite material according to claim 11, wherein the reinforcing fiber is a carbon fiber.

13. A fiber-reinforced composite material comprising a cured product of the molding material for a fiber-reinforced composite material according to claim 11.

* * * * *